United States Patent

Byung-Gie et al.

[11] Patent Number: 5,558,610
[45] Date of Patent: Sep. 24, 1996

[54] ROLLING ROLLER

[75] Inventors: Kwun Byung-Gie; Choi Chang-Hee, both of Seoul, Rep. of Korea

[73] Assignee: Korea Tungsten Co., Inc., Kyungsangbuk-Do, Rep. of Korea

[21] Appl. No.: 369,418

[22] Filed: Jan. 6, 1995

[30] Foreign Application Priority Data

Mar. 5, 1994 [KR] Rep. of Korea .................. 94-4300

[51] Int. Cl.[6] ...................................................... B21B 13/00
[52] U.S. Cl. ................................. 492/40; 492/45; 492/46
[58] Field of Search .................................. 492/40–45, 46

[56] References Cited

U.S. PATENT DOCUMENTS

| | | |
|---|---|---|
| 4,010,528 | 3/1977 | Böhmer . |
| 4,372,628 | 2/1983 | Kiener et al. . |
| 4,888,862 | 12/1989 | Brandenstein et al. . |
| 5,114,248 | 5/1992 | Horsdorff . |

*Primary Examiner*—Carl J. Arbes
*Attorney, Agent, or Firm*—Harrison & Egbert

[57] ABSTRACT

The present invention relates to a rolling roller. A conventional rolling roller has had problems that a phenomenon is produced in which a rolling ring is slipped from a shaft upon rolling, and excessive axial pressure is produced upon fixing the rolling ring to the shaft by utilizing an adjusting screw whereby a unreasonable tensile force is applied and therefore a fatigue and damage of the shaft is increased fast. However, the present invention is made such that a large torque can be obtained without slipping operation by coupling a first and second spacers 23,24 and a rolling rings 20,25 which are formed with a projected slant surface a and an inclined groove b, and a unreasonable tensile force is not applied to the shaft due to that so that a fatigue and damage of the shaft can be prevented.

2 Claims, 4 Drawing Sheets

5,558,610

ROLLING ROLLER

TECHNICAL FIELD

The present invention relates to a rolling roller, and more particularly to a rolling roller in which a coupling structure of spacer and rolling ring consisting of rolling roller is improved so that when a shaft rotating power is transferred to the rolling ring, larger torque transfer can be made, and fatigue and damage of the shaft can also be made to be positively reduced.

BACKGROUND OF THE INVENTION

The rolling is a processing method for making a plate material, bar material, tube material, and form material of various section by passing through a metal material of high temperature or normal temperature between rolling rings of the rolling roller (generally, a material excellent in wear-resistant property such as ultra-hard alloy, ceramic, or hard alloy is used).

The rolling roller used for this rolling work, its conventional form is shown in FIG. 1(A) and (B).

That is, it is made by a structure comprising: a shaft 1 including key grooves 5a,6a made to receive keys 5,6 for fixing first and second spacers 3,4 to the shaft 1 which is constant in diameter of portion to be assembled by inserting in turn the first spacer 3, the rolling ring 2 and the second spacer 4, and a thread portion 9 for coupling a ring nut 7 fixing an open end when the first spacer 3, a rolling ring 2, and the second spacer 4 are assembled to the shaft 1 together with the keys 5,6 of key groove 5a,6a sides; the keys 5,6 to be respectively inserted and fixed to the key grooves 5a,6a of the shaft 1; the first and second spacers 3,4 to be fixed respectively to the shaft 1 by the keys 5,6; and a ring nut 7 to be coupled to a thread portion 9 together with an adjusting screw 8.

And, FIG. 2(A) and (B) show another form of conventional rolling roller.

Here, it is made by a means that a shaft portion positioned with the first and second spacers 3,4, and the rolling ring 2 has a tapered taper portion 10, and the first spacer 3, the rolling ring 2 and the second spacer 4 are inserted in turn to the taper portion 10, and thereafter a tapered cylindrical sleeve 11 is forcibly inserted by pressing to inside of those tubes so that the rolling ring 2 is fixed to the shaft 1.

And, FIG. 3(A) and (B) are still other form of conventional rolling roller, and here as in the cases of FIG. 1 and FIG. 2, it is made by a means for fixing the rolling ring 2 to the shaft 1 by inserting in turn a plurality of tray springs 12, first spacer 3, rolling ring 2, second spacer 4 and a ring nut 7 to the shaft 1 having a thread portion 9 and a taper portion 10.

In accordance with a thing of FIG. 1 among the conventional rolling roller as this, as in FIG. 1(B), a multiplicity of adjusting screws 8 tightened to the ring nut 7 are released toward arrow direction so that the rolling ring 2 obtains a large torque when the shaft 1 of the rolling roller for processing a raw material A is rotated by a driving power.

At this moment, the second spacer 4 is pushed toward the rolling ring 2 in an axial direction released with the adjusting screw 8, and as a result, the rolling ring 2 is tightly fixed to the shaft 1 by an axial pressure due to the pushing operation of the second spacer 4.

However, here since a strong axial pressure can be produced to the rolling ring 2, a fixing property with the shaft 1 can be improved, but on the contrary, an excessive axial pressure produced by the adjusting screw 8 can give a unreasonable tensile force to the shaft 1, and the production of this unreasonable tensile force has been caused to make a fatigue and damage of the shaft 1 to be fast.

And, in the case of FIG. 2, a tapered thin cylindrical sleeve 11 is coupled to outer side of the shaft 1 formed with the taper portion 10 whereby a strong anti-pressure is made to the rolling ring 2 so that the rolling ring 2 can be tightly fixed to the shaft 1.

However, here since the anti-pressure of the portion contacted with the sleeve 11 and the shaft 1 is large, when thickness of the rolling ring 2a becomes thinner by an abrasion of the rolling ring 2 during using or a re-grinding, the rolling ring 2 can not overcome the anti-pressure whereby it may be damaged, and therefore there has been a problem for obtaining its structural reliability.

And, a temperature of the rolling roll can not but be risen by a contact with the high temperature rolling material during using, and in this case, a coupling strength change of the rolling ring 2 and the shaft 1 is caused by a diametral expansion of the coupling portion, and therefore there has been a problem to reduce a structural reliability.

And, in the case of FIG. 3, the rolling ring 2 is fixed 1 by using three tray springs 12 and a divided rings 13 to the shaft 1 having the taper portion 10 so as to be able to correct the problem of above described conventional technique, so that appropriate torque force was obtained and simultaneously firm supporting property could be obtained.

However, since this makes to manufacture inner diameter of each constituting part to be tapered, an easiness of its manufacture is difficult to secure, and it has caused a price raising of these parts due to use of relatively many parts.

And, since it is a structure that relatively many number of parts are coupled to the shaft 1, it was difficult thing to exclude a disadvantageous problem also due to a length of the rolling roller itself becomes long and a volume or weight is increased, and other than these, a coupling force weakening between the parts by a temperature change may be caused, and when the rolling ring 2 is damaged unexpectedly, there has been a problem to give a damage directly to the shaft 1.

SUMMARY OF THE INVENTION

Therefore it is an object of the present invention to provide a rolling roller which is made to be able to improve such problem of conventional technique.

Another object of the present invention is to provide a rolling roller which is made such that an inclined groove and projected slant surface which are made such that spacers and rolling ring can be fitted each other are included at a portion contacting with these one another whereby a large torque from the shaft to the rolling ring can be transferred, and a fatigue and damage of the shaft can be prevented because a unreasonable tensile strength is not given to the shaft.

DETAILED DESCRIPTION OF THE PREFERRED EMBODIMENTS

Hereinafter, more concrete features of the present invention may be understood by explaining more in detail with reference to the accompanying drawings.

Figure 1A:
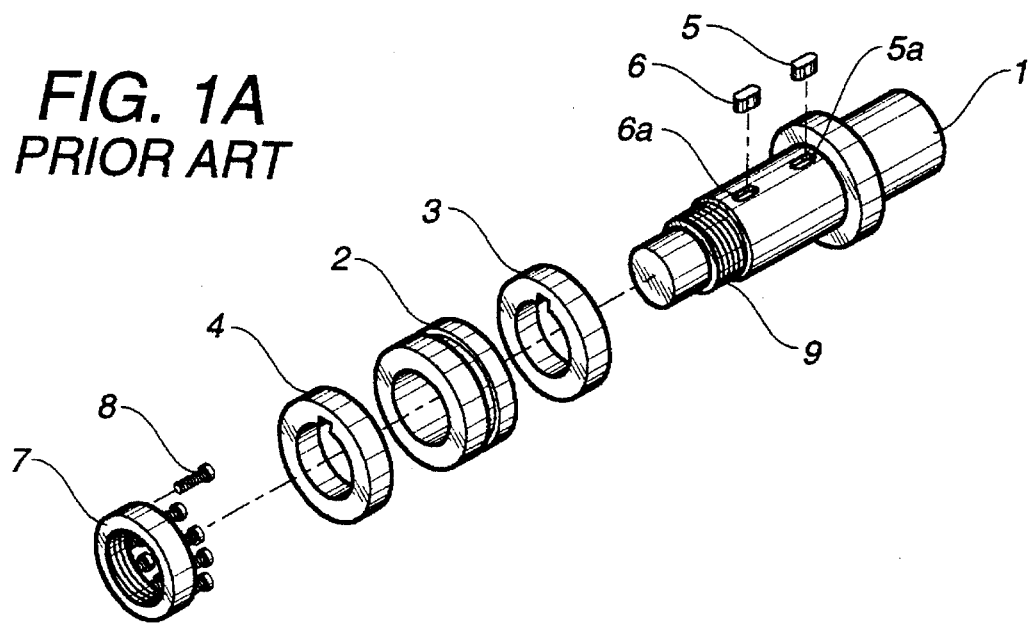
FIG. 1(A) is an exploded perspective view showing a conventional rolling roller, FIG. 1 (B) is a partial cross sectional view showing major parts in a state coupled (A)
Figure 1B:
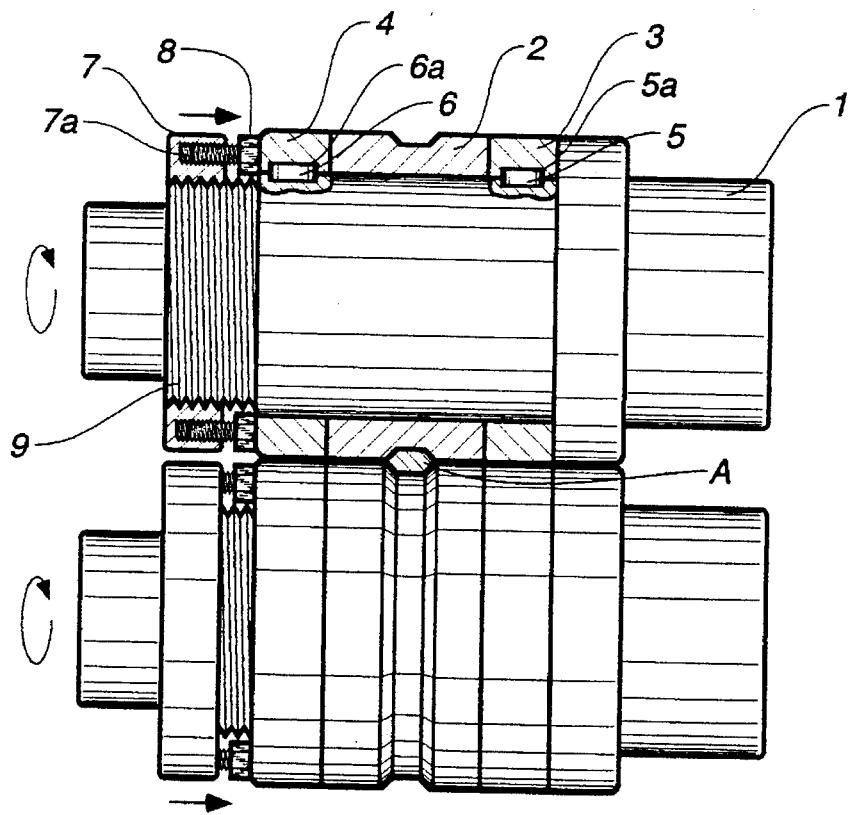
Figure 2A:
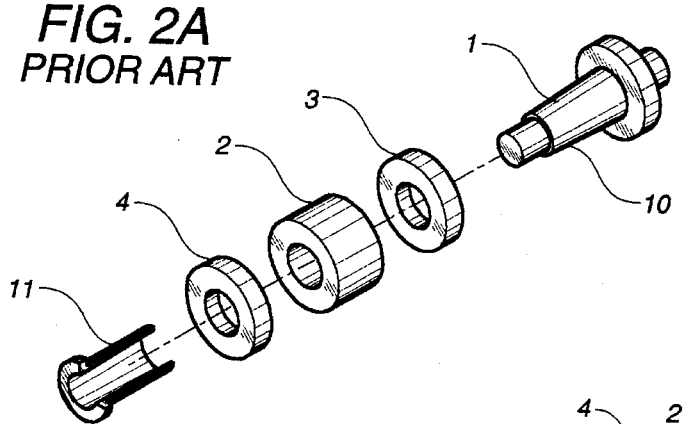
FIG. 2(A) is a view showing another example of a conventional rolling roller.
Figure 2B:
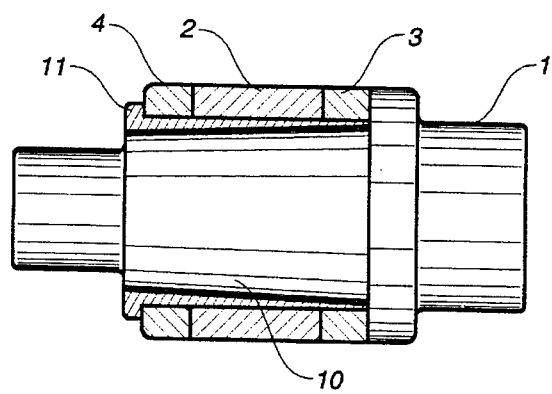
FIG. 2(B) is a partial cross sectional view showing major parts in a state coupled (A)
Figure 3A:
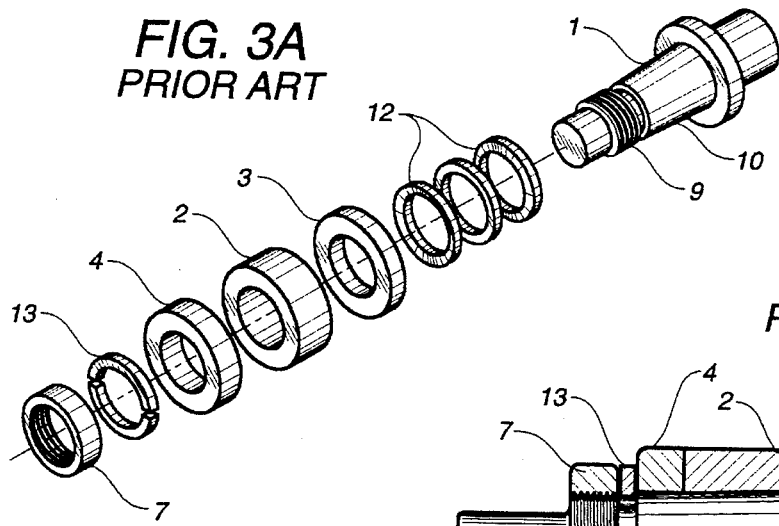
FIG. 3(A) is a view showing still other example of a conventional rolling roller.
Figure 3B:
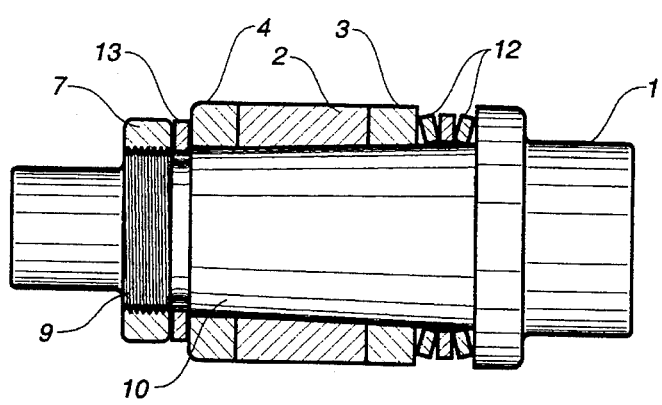
FIG. 3(B) is a partial cross sectional view showing major parts in a state coupled (A)
Figure 4A:
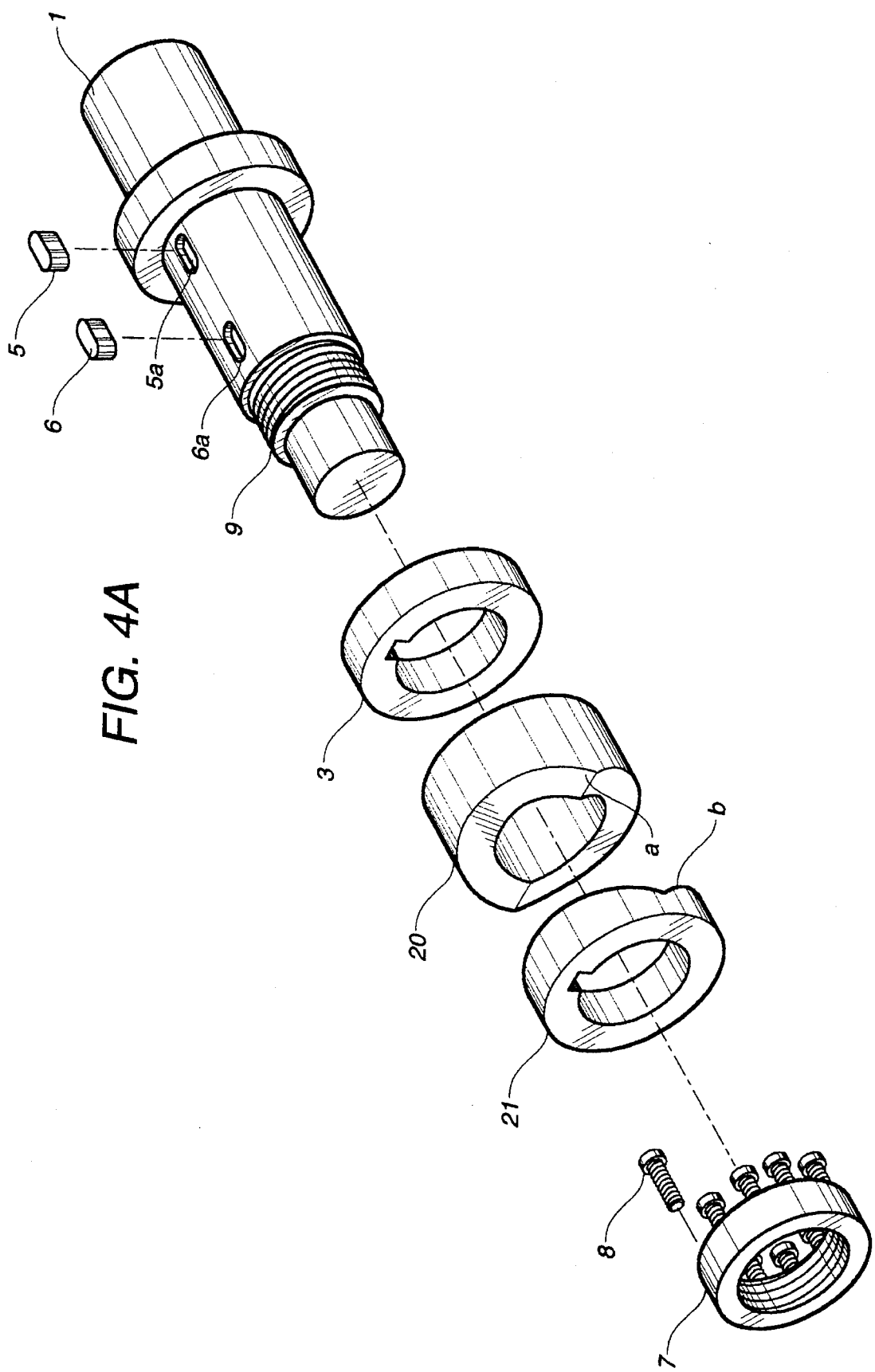
FIG. 4(A) is an exploded perspective view of a rolling roller in accordance with the present invention.

FIG.4 shows a rolling roller in accordance with the present invention.

Here, in a rolling roller comprising a shaft 1 having key grooves 5a,6a and thread portion 9 and which is constant in diameter of predetermined portion, keys 5,6 to be fixed by inserting respectively to the key grooves 5a,6a of the shaft 1, first and second spacers to be fixed to the shaft 1 by the keys 5,6, a rolling ring to be interposed between the first and second spacers, and a ring nut 7 to be coupled to a thread portion 9 of the shaft 1 together with a tightening adjusting screw 8, said rolling ring is made by a rolling ring 20 having an appropriately projected slant surface a at a contacting portion with the second spacer, and a second spacer 21 forming an inclined groove b of shape being same as the projected slant surface a of the rolling ring 20.

Figure 5:
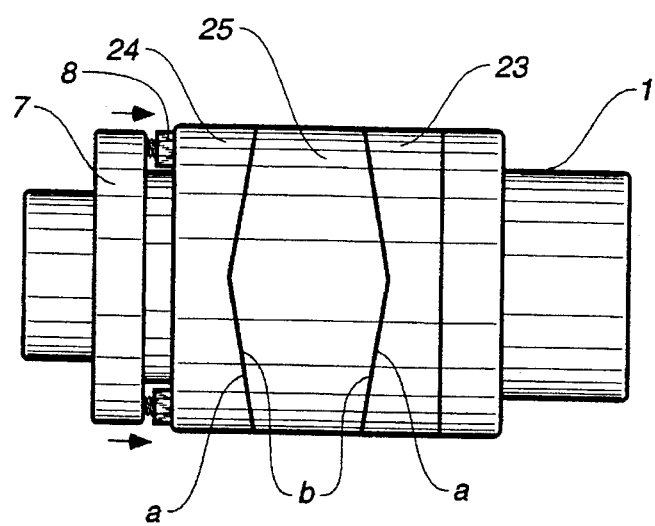
FIG. 5 is a diagram showing another embodiment of FIG.4.

And, FIG. 5 shows another embodiment of the present invention.

Here the rolling ring 20 is made by a rolling ring 25 having a projected slant surface a at both ends projected at a predetermined height with a portion contacting respectively with the first and second spacers, and it is made by first and second spacers 23,24 having an inclined groove of a shape same as the projected slant surface a at a portion corresponding respectively to the projected slant surface a of the rolling ring 25, and remaining structure except these are same as the case of FIG. 4.

The present invention of these construction is as followings in its operation and effect.

Firstly, in accordance with a method for assembling the present invention, an assembling of the rolling roller is completed by coupling the first spacer 3 together with the key 5 coupled to the key groove 5a at the shaft 1, and coupling a rolling ring 20 having a projected slant surface a at one side to the first spacer 3, and thereafter tightening a second spacer 21 having one side inclined groove b of a shape same as the projected slant surface a to the key groove 6a together with the key 6, and tightening the ring nut 7 coupled with an adjusting screw 8 to a number of female screw portion 7a to the thread portion 9 formed to the shaft 1.

Figure 4B:
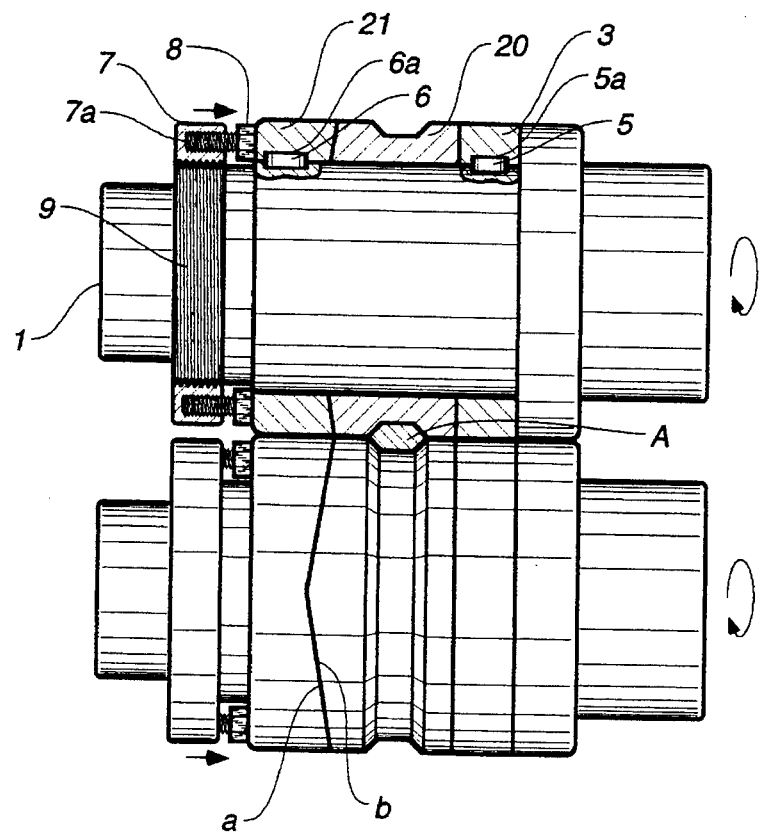
FIG. 4(B) is a partial cross sectional view showing major parts in a state coupled (A)

In accordance with the rolling roller assembled as this, as shown in FIG.4(B), when a raw material A is extruded between rotating parallel two shafts 1, the first and second spacer 3,21 advance a rotation by the keys 5,6 together with the rolling ring 20 tightened to the shaft 1.

At this moment, the inclined groove h of the second spacer 21 is fitted with the projected slant surface a of the rolling ring 20 whereby advances a close contact rotating operation by a surface pressure.

And, when a number of adjusting screws 8 tightened to the ring nut 7 is released toward arrow direction and the second spacer 21 is further contacted by pressure and fixed to the rolling ring 20 and the first spacer 3, the rolling ring 20 is firmly fixed to the shaft 1 whereby the rolling ring 20 can obtain a strong torque without slipping from the shaft 1.

And, a unreasonable tensile force by the rolling ring 20 is not transferred to the shaft 1 due to that.

At this time, the rotating force (rolling torque) required to the rolling is transferred at about 20–30% by a frictional force between the rolling ring 20 and the first spacer 3, and 70–80% can be transferred by the second spacer 21 and the rolling ring 20 formed with the inclined groove and the projected slant surface.

In FIG. 5 which is another embodiment of the present invention, both ends' projected slant surface a of the rolling ring 25 is fitted respectively to the inclined grooves of the first and second spacers 23,24 by the rotation of the shaft 1, so that it becomes to be able to transfer a doubled larger torque than the operational property of FIG. 4.

On the other hand, as described above, when a number of adjusting screws 8 tightened to the ring nut 7 are released toward arrow direction, the rolling ring 25 coupled with the first and second spacers 23,24 is further contacted by pressing whereby the rotating force can be transferred without slipping.

Thus, in accordance with the present invention, since the rolling roller is made by a coupling structure of the spacer and the rolling ring formed with the inclined groove and the projected slant surface, a slipping produced upon rolling as before can be prevented, and since a unreasonable tensile force is not applied to the shaft, a fatigue and damage of the shaft can also be positively prevented.

What is claimed is:

1. In a rolling roller comprising a shaft 1 having key grooves 5a,6a and a thread portion 9 and which is constant in diameter of predetermined portion, keys 5,6 to be fixed by inserting respectively to the key grooves 5a,6a of the shaft 1, first and second spacers to be fixed to the shaft 1 by the keys 5,6, a rolling ring to be interposed between the first and second spacers, and a ring nut 7 to be coupled to a thread portion 9 of the shaft 1 together with a tightening adjusting screw 8, a rolling roller in which said rolling ring is made by a rolling ring 20 having an appropriately projected slant surface a at a contacting portion with the second spacer, and a second spacer 21 forming an inclined groove b of shape being same as the projected slant surface a of the rolling ring 20.

2. Rolling roller as defined in claim 1, wherein said rolling ring 20 is made by a rolling ring 25 having a projected slant surface a at both ends projected at a predetermined height with a portion contacting respectively with the first and second spacers, and it is made by first and second spacers 23,24 having an inclined groove b of a shape same as the projected slant surface a at a portion corresponding respectively to the projected slant surface a of the rolling ring 25.

* * * * *